(12) United States Patent
Noro (10) Patent No.: US 6,359,423 B1
(45) Date of Patent: Mar. 19, 2002

(54) METHOD AND SYSTEM FOR SUPPRESSING A VOLTAGE FLUCTUATION IN A POWER SYSTEM

(75) Inventor: Yasuhiro Noro, Hino (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/690,720

(22) Filed: Oct. 18, 2000

(30) Foreign Application Priority Data

Oct. 19, 1999 (JP) .......................................... 11-296077

(51) Int. Cl.⁷ .............................................. G05F 3/02
(52) U.S. Cl. ...................................... 323/208; 323/207
(58) Field of Search ................................. 323/205, 207, 323/209, 210, 211, 208

(56) References Cited

U.S. PATENT DOCUMENTS 5,291,120 A  * 3/1994 Leowald et al. ............ 323/209
5,355,076 A  * 10/1994 Chadwick ................... 323/208
5,570,007 A  * 10/1996 Larsen ........................ 323/209

OTHER PUBLICATIONS

S. Fujitaka, et al., "Transmission and Distribution Engineering", pp. 10–15 (1969).
S. Irokaw, "FACTS—Power System Stabilizing Equipment", pp. 58–63, (1998).

* cited by examiner

*Primary Examiner*—Adolf Deneke Berhane
(74) *Attorney, Agent, or Firm*—Finnegan, Henderson, Farabow, Garrett & Dunner, L.L.P.

(57) ABSTRACT

A system for compensating a voltage fluctuation in a transmission line of a power system is such that a power detection circuit detects a voltage and power flow in the transmission line involving a voltage fluctuation to be compensated, a calculation circuit calculates an impedance compensation amount for adjusting a voltage on the transmission line on the basis of the voltage and power flow detected by the detection circuit and a control circuit controls an adjusting device on the power system on the basis of the impedance compensation amount calculated by the calculation circuit.

13 Claims, 9 Drawing Sheets

METHOD AND SYSTEM FOR SUPPRESSING A VOLTAGE FLUCTUATION IN A POWER SYSTEM

CROSS-REFERENCE TO RELATED APPLICATIONS

This application is based upon and claims the benefit of priority from the prior Japanese Patent Application No. 11-296077, filed Oct. 19, 1999, the entire contents of which are incorporated herein by reference.

BACKGROUND OF THE INVENTION

The present invention relates to a method and system for suppressing a voltage fluctuation in a power system.

The voltage maintenance of an electric power system is very important from the standpoint of the supply of an electric power. In order to suppress the voltage fluctuation, it is necessary to adjust a reactive power constituting the greatest factor of a voltage fluctuation. For such fluctuation, a state condenser, shunt reactor and/or static Var compensator (SVC) are applied to a power system.

Figure 1:
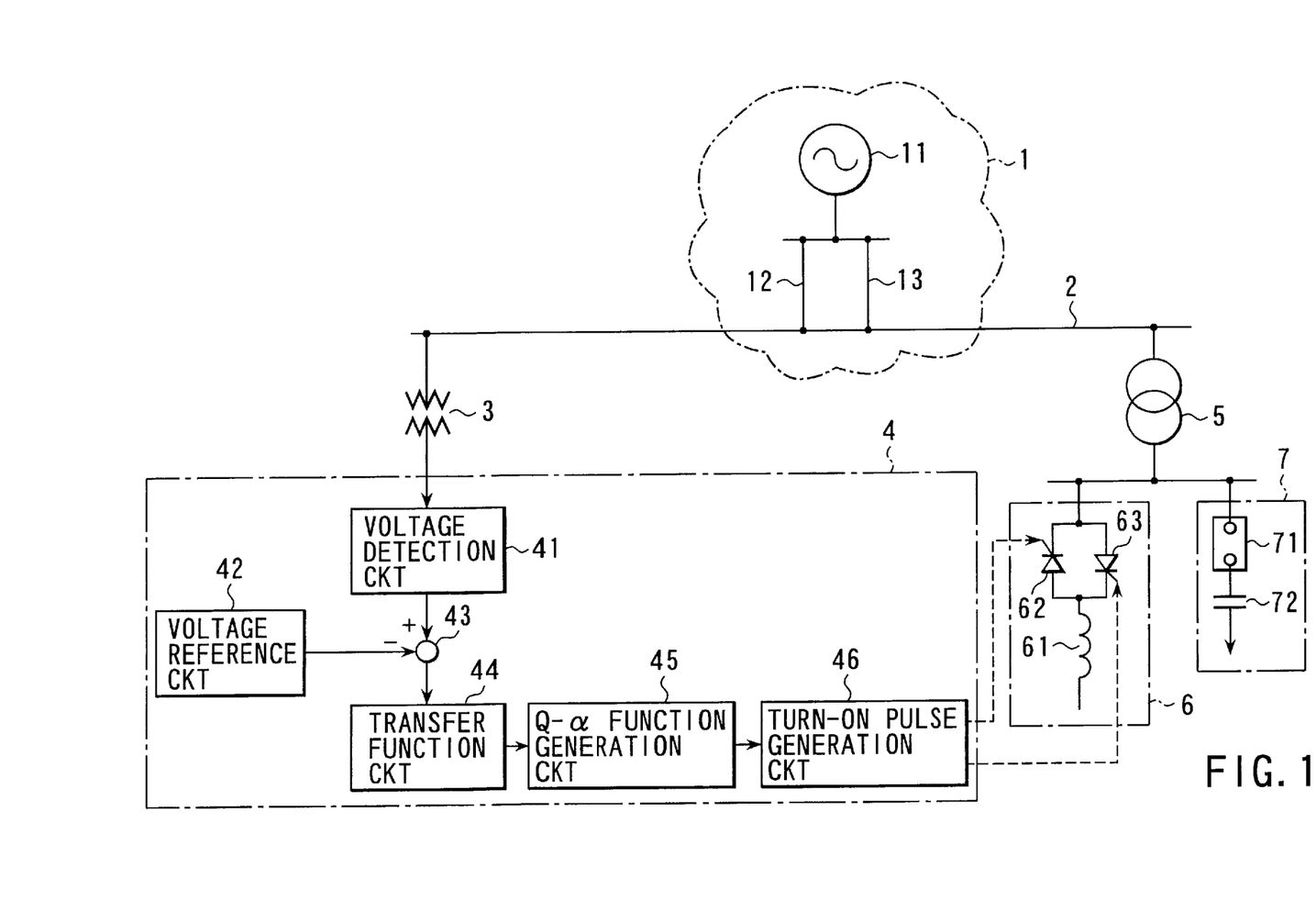
FIG. 1 is a circuit diagram showing a conventional static type reactive power compensation apparatus.

FIG. 1 is a diagram showing a structure in which the SVC is applied to a conventional power system. In FIG. 1, a power system 1 includes a power source 11, transmission lines 12, 13 and substation bus 2 and the SVC is applied to the power system 1.

This SVC comprises a voltage transformer 3 connected to the power system 1, controller 4 for allowing the inputting of a bus voltage detected by the voltage transformer 3, thyristor controlled reactor (TCR) 6 connected to the power system 1 through a down voltage transformer 5 and adapted to be controlled by a control value from the controller 4, and state condenser 7 connected to the power system 1 through the down voltage transformer 7.

The thyristor controlled reactor (TCR) 6 comprises a rector 61 and thyristors 62 and 63 connected cathode-to-anode and the state condenser 7 comprises a switch 71 and capacitor 72. The controller 4 comprises a voltage detection circuit 41, voltage reference circuit 42, adder 43, transfer function circuit 44, Q-α function generation circuit 45 and turn-on pulse generation circuit.

The operation summary of the SVC in FIG. 1 is as follows: That is, the phase control of the thyristors 62, 63 in the thyristor controlled reactor (TCR) 6 and ON-OFF control of the switch 71 in the state condenser 7 are so performed by the controller 4 as to supply a leading phase reactive power when, in the case where a voltage on the bus of the power system 1 is detected by the voltage transformer 3 in FIG. 1, the voltage on the bus is lowered and to supply a lagging phase reactive power when the voltage on the bus is raised.

Stated in more detail about the operation of the SVC, the output of the voltage transformer 3 is converted by the power detection circuit 41 to an effective value or root-mean-square value and the output of the power detection circuit is compared by the adder 43 with the output of the voltage reference circuit 42 and a deviation is input to the transfer function circuit 44. The transfer function circuit 44 is comprised of, for example, a proportional plus integral circuit and determines a reactive power operation amount of the SVC so as to allow the deviation of the input to become zero or as small as possible, that is, to allow the voltage on the bus 2 to coincide with a set value of the voltage reference circuit 42.

The output of the transfer function circuit 44 is supplied to the Q-α function generation circuit 45 to allow a conversion to a phase control angle of the thyristors 62, 63 in the thyristor controlled reactor (TCR) 6 and allows the turn-on pulse generation circuit 46 to supply a gate pulse. At the thyristor controlled reactor (TCR) 6, the output reactive power can be continuously adjusted, by the phase of the gate pulse, in a range from zero to a capacity of the reactor 61 and, through the utilization of a voltage-reactive power characteristic on the power system 1 side, eventually the voltage on the bus 2 is adjusted.

Further, in the case where the value of the phase control angle suffers such a larger voltage fluctuation as to reach an upper limit value or lower limit value, the switch 71 of the state condenser 7 is turned ON or OFF to allow a reactive power supply amount to greatly vary. This, together with the thyristor controlled reactor (TCR), provides a broader controllable range.

The response characteristic of this SVC is determined by the transfer function circuit 44 and its control constant is determined by the structure and short-circuiting capacity of the power system 1, capacity of the thyristor controlled reactor (TCR) 6, and target response speed.

However, the structure of the power system 1 varies due to various factors, such as a power system fault, inspection servicing, and start and stop of a generator constituting a power source.

When the control constant of the transfer function circuit 44 is determined with due consideration paid to a high speed response, then there are sometimes the cases where the response becomes unstable if a short-circuiting capacity of the bus 2 becomes smaller, such as in the case where the transmission line 12 in FIG. 1, for example, is separated due to the power system fault.

When, on the other hand, the control constant of the transfer function circuit 44 is determined with due consideration paid to the stability, then there occurs an inconvenience that the response speed at a usual time is slowed.

Further, in the case where a short-circuiting capacity on the power system 1 side is greater, even if a generation amount of the reactive power is adjusted by a pulse control of the thyristor controlled reactor (TCR) 6, then a reactive power operation amount is eventually greater because a fluctuation of the voltage on the bus 2 is smaller. And there is an inconvenience that the value of the phase control angle is liable to reach an upper limit value or a lower limit value.

BRIEF SUMMARY OF THE INVENTION

It is accordingly the object of the present invention to provide a method and system for compensating a voltage fluctuation occurred in the transmission line, so as to suppress a voltage fluctuation in a power system.

The above-mentioned object is achieved by the following method. That is, the method applied to a power system having transmission lines and compensating a voltage fluctuation in the transmission line, comprises the steps of detecting an electric parameter, such as characteristic impedance Zo, transmission line's voltage V and power flow P, of the transmission lines which involves a voltage fluctuation to be compensated; calculating a control parameter for adjusting the voltage on the transmission line on the basis of the electric parameter detected by the detecting step; and compensating the voltage fluctuation in the transmission line on the basis of the control parameter calculated by the calculating step.

The above-mentioned is also achieved by the following system. That is, the system applied to a power system having a plurality of transmission lines and compensating a voltage fluctuation in the transmission line comprises detecting means for detecting an electric parameter of a transmission line of the transmission lines which involves a voltage fluctuation to be compensated, calculating means for calculating a control parameter for adjusting a voltage on the transmission line on the basis of the electric parameter detected by the detecting means, and compensating means for compensating a voltage fluctuation in the transmission line on the basis of the control parameter calculated by the calculating means.

The above-mentioned object is achieved by the following apparatus. That is, the apparatus for compensating a voltage fluctuation in a transmission line comprises an adjusting device provided on a power system having a plurality of transmission line members and adjusting at least one of a reactive power and impedance, a detecting section for detecting an electric parameter of a transmission line member of the transmission line members which involves a voltage fluctuation to be compensated, a calculation section for calculating a compensation amount for adjusting a voltage of the transmission line member on the basis of the electric parameter detected by the detecting section, and a control section for generating a control signal to be given to the adjusting device on the basis of the compensation amount calculated by the calculating section.

According to the present invention, a capacitive or inductive reactance element is arranged in a series array or parallel array on the transmission line and the reactance element can be so controlled as to satisfy an equation $P=V^2/Z_o$ and a voltage fluctuation in the transmission line is compensated, so that control is so made as to maintain a voltage between the ends of the transmission line constant.

Further, the transmission line as a compensation target is initially determined and it is not affected by the other fluctuation factors on the power system and the apparatus of the present invention operates safely and, if a capacity is so initially determined as to meet a maximum power flow in the transmission line, an overload is less likely be produced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be explained below with reference to the accompanying drawings.

Figure 2:
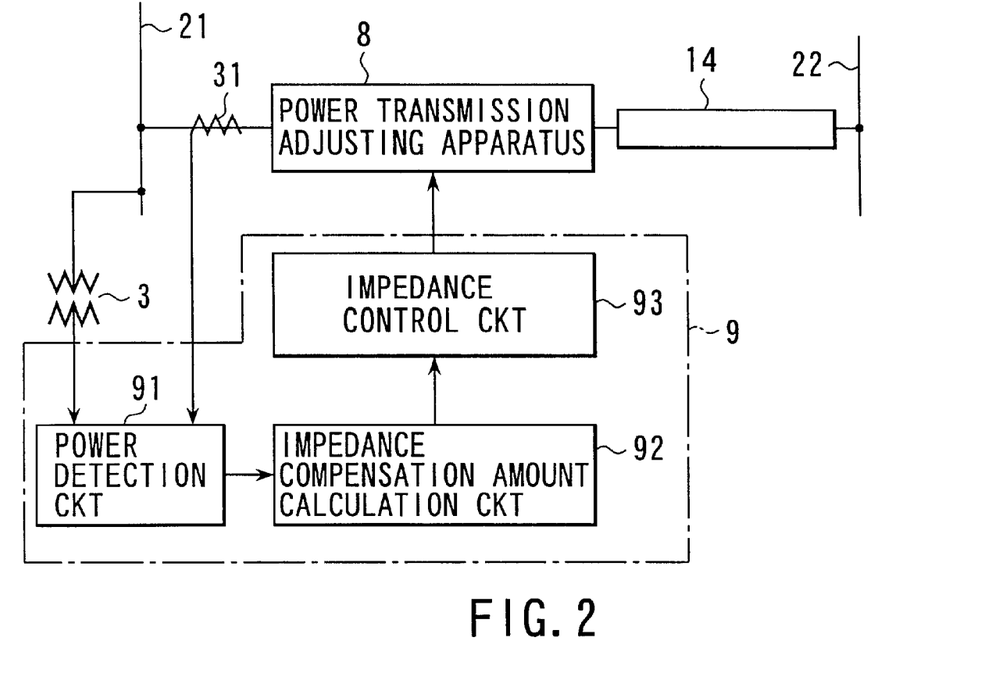
FIG. 2 is a circuit diagram showing an apparatus according to a first embodiment of the present invention.

FIG. 2 is a circuit diagram showing a system of the first embodiment. In FIG. 2, reference numerals 21, 22 show the buses of a power system and 14 shows a transmission line having a power transmission adjusting device 8 connected in series with the transmission line 14. Further, reference numeral 3 shows a voltage transformer and 31 shows a current transformer. The outputs of these transformers are connected to a controller 9 for controlling the power transmission adjusting device 8.

The controller 9 comprises a power detection circuit 91 for detecting electric power by receiving the detection values of the voltage transformer 3 and current transformer 31, an impedance compensation amount calculation circuit 92 for calculating an impedance compensation amount by receiving the electric power detected by the power detection circuit 91, and an impedance control circuit 93 for controlling the impedance calculating amount from the impedance compensation amount calculation circuit 92. It is to be noted that not only the voltage and current values detected by the voltage transformer 3 and current transformer 31 but also the frequency, phase, impedance, resistance, inductance, conductance, static capacity, etc., of the transmission line 14 define electric parameters of the transmission line 14.

Then the operation of this embodiment will be explained below.

First, the characteristics of the transmission line of the power system will be explained below. That is, in general, the transmission line of the power system has its line constants, that is, a resistance, inductance, leakage conductance and static capacitance, uniformly distributed along the transmission line and, in a stricter sense, has to be handled as a distributed constant circuit.

Figure 3:
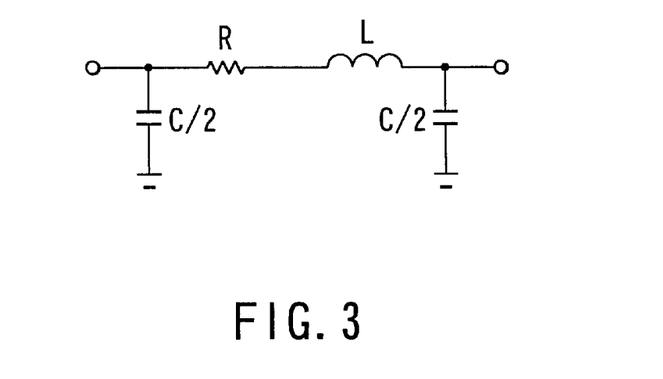
FIG. 3 is a view for explaining an equivalent circuit of a transmission line.

In a short or medium distance transmission line, however, the line constant can be handled as a lumped parameter circuit at a single place or several places and it has been the common practice to represent the equivalent circuit of the transmission line by the lumped constant. FIG. 3 represents the electric characteristic of the transmission line by a general π type equivalent circuit. Here, R represents a resistive component, L, an inductance, and C, a static capacitance.

The impedance of the transmission line for a commercial frequency fo is usually R<2π foL and, since the resistance R is smaller in contribution in the study of the voltage fluctuation, it is omitted for the sake of brevity in consideration. In this line, $$Zo=(L/C)^{1/2}=(X/Y)^{1/2} \tag{1}$$

is called a characteristic impedance and, with V representing a voltage on the sending end of the transmission line, when the active power is $P=V^2/Zo$ and a power transmission is performed with a power factor 1, it follows that, a voltage in maintained constant at each part of the transmission line 14 (reference data: [Electric Circuit] "Distributed Constant Line" chapter 8 pp. 163 to 172, published by ASAKURA SHOTEN). In this connection it is to be noted that $X=2\pi$ foL, $Y=2\pi$ foC.

Figure 4:
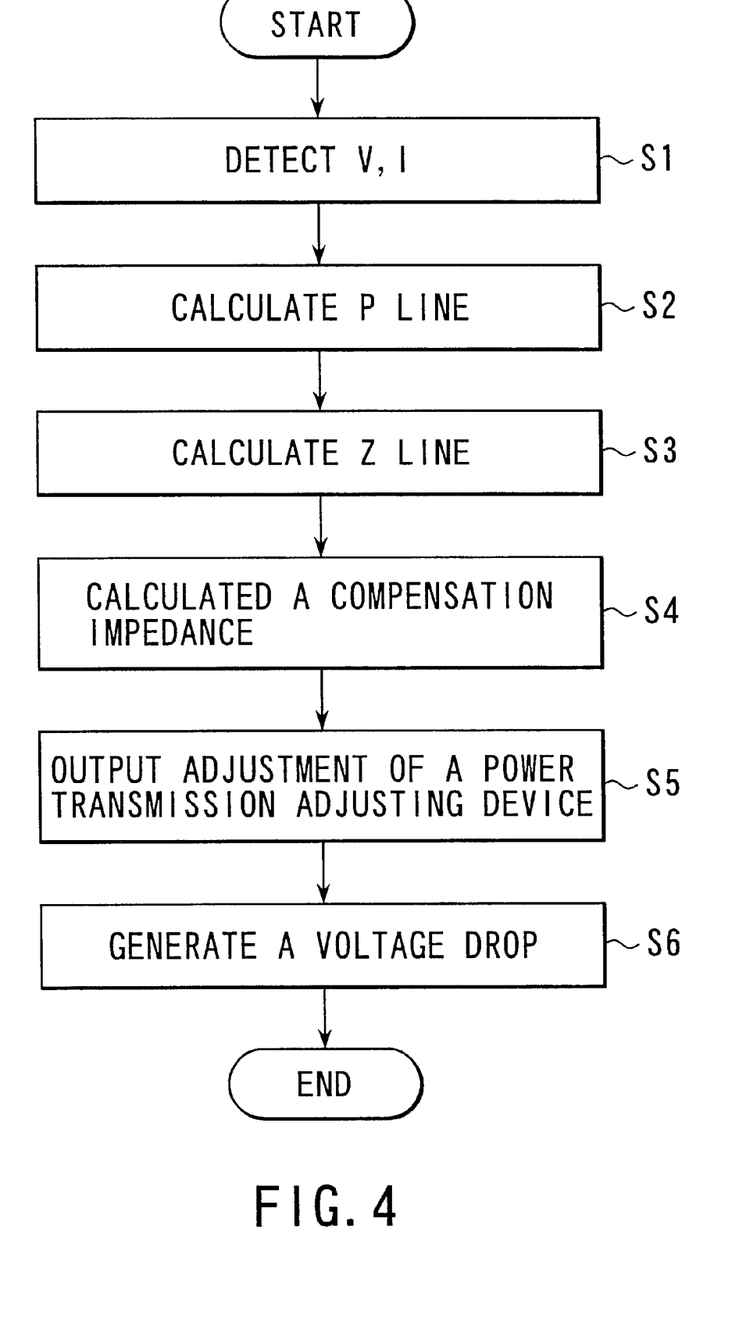
FIG. 4 is a flow chart for explaining an operation of the embodiment.

According to the present invention, as shown in FIG. 4, using a voltage detected at the voltage transformer 3 and transmission line's current detected at the current transformer 31 as inputs, the power detection circuit 91 detects a power flow P line through the transmission line. Then using the power flow line $P_{line}$ as an input, the impedance compensation amount calculation circuit 92 calculates a compensation amount as will be set out below.

Using the voltage V on the bus detected through the voltage transformer 3 and above-mentioned power flow $P_{line}$, the effective characteristic impedance $Z_{line}$ is calculated as follows, $$Z_{line}=V^2/P_{line} \tag{2}$$

Here, it is better to make the characteristic impedance $Zo=Z_{line}$ and, from Equation (1), $$(X/Y)^{1/2}=Z_{line}$$

$$X=Z_{line}^2 y \tag{3}$$

The reactance $X_{line}$ and admittance $Y_{line}$ on the transmission line 14 are known and, in the present embodiment, the parallel admittance $Y_{line}$ cannot be compensated and series impedance $X_{line}$ is compensated. It is only necessary, therefore, to adjust the output of the power transmission adjusting device 8 so that the compensation impedance $\Delta X$ $$\Delta X=X-X_{line}=Z_{line}^2 Y-X_{line} \tag{4}$$

Therefore, the output control of the power transmission adjusting device 8 is so made by the impedance control circuit 93 as to provide an inductive impedance when the compensation impedance $\Delta X$ is positive and a capacitive impedance when the compensation impedance $\Delta X$ is negative.

As a result, a voltage drop for compensating a voltage fluctuation occurring in the transmission line 14 occurs in the power transmission adjusting device 8, so that the voltages on the buses 21, 22 are made equal in magnitude to each other.

The characteristic impedance shown in Equation (1) is established at the distributed constant circuit. If, however, the frequency is restricted to the commercial frequency, an error is smaller even in the case where compensation is made at one lumped site and an adequate performance is revealed in a practical application.

Although, in the explanation of the present embodiment, the device has been explained as being arranged at the sending end of the transmission line, the device can be arranged at either of the sending and receiving ends according to the present invention. It is also possible to apply the device even to an intermediate point of the system or a loop system. This feature is common among all the embodiments of the present invention including this embodiment.

Further, the power factor of the transmission line for the above-mentioned calculation equation is based on unity. However, the power factor of the actual transmission line may be not unity and, in this respect, contains an error.

In actuality, however, even from the standpoint of the effective utilization of the rated capacity of the transmission line and suppression of the voltage fluctuation, control is so made at a substation on a load end as to compensate a reactive power generated on the load side and to make the power factor of a current in the transmission line near to unity. As a result, the error involved can be made in a negligible extent.

In the case where a long-distance transmission line is handled as a voltage adjusting target, if a system voltage adjusting apparatus comprising the power transmission adjusting device 8 and controller 9 shown in the present embodiment is provided at each proper interval of, for example, a switching station, substation, etc., on the way, a voltage compensation effect is further enhanced.

Further, in place of calculating the $Z_{line}$ from the power flow $P_{line}$ in Equation (2), the $Z_{line}$ is also made $$Z_{line}=\text{Real}(V/I) \tag{240}$$

using a current I detected at the current transformer 31 and the same function can be obtained.

As set out above, according to the present embodiment, such a voltage as to cancel a voltage fluctuation generated in the transmission line 14 is generated in the transmission adjusting device 8 and, by doing so, it is possible to compensate a voltage fluctuation generated in the transmission line.

The power transmission adjusting device 8 of the present invention has its compensation target transmission line initially determined and is not affected by other than the power system-side fluctuation factor and operates stably. If, in addition, a capacity is so determined as to meet the greatest power flow in the transmission line, there is the advantage of being less liable to produce any overload.

Figure 5:
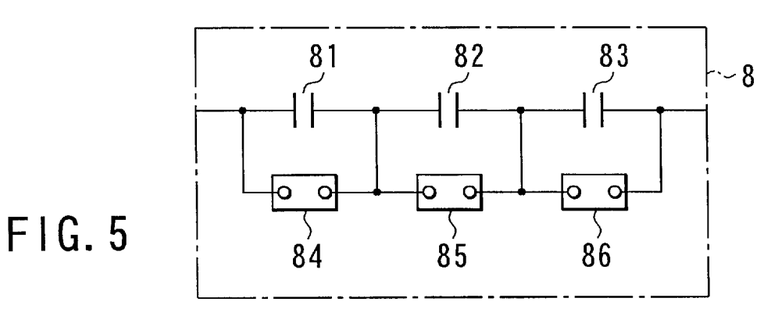
FIG. 5 is a circuit diagram showing a power transmission adjusting device in an apparatus according to a second embodiment of the present invention.

FIG. 5 shows a connection of a power transmission adjusting device 8 in a second embodiment of the present invention.

In FIG. 5, reference numerals 81 to 83 show capacitors and 84 to 86 show switches. As shown in FIG. 5, a plurality of parallel circuits each comprising the corresponding capacitor and switch are connected in a series array. According to this embodiment, there are three combinations of the capacitor and switch and, even if there are one or more parallel combinations, these perform basically the same function. It may be possible that the capacitors 81 to 83 are comprised of a plurality of capacitors connected in a series array or a capacitor with a plurality of taps.

In the embodiment above, with the switch 84 in an open-circuited state, the capacitor 81 is placed in a series array across the terminals of the power transmission adjusting device 8 and, with the switch 84 in a short-circuited state, the capacitor 81 is ignored. With the static capacitances of the capacitors 81, 82 and 83 represented by C1, C2 and C3, respectively, the static capacitance across the terminals of the power transmission adjusting device 8 becomes C1, provided that, for example, the switch 84 alone is open-circuited and the remaining switches 85, 86 are short-circuited. In the case where all the switches are open-circuited, the static capacity across the terminals of the power transmission adjusting device 8 becomes C1·C2·C3/(C1·C2+C2·C3+C3·C1). Even in the other open-/short-circuited combinations of these switches it is possible to similarly calculate the static capacitances. In other words, the power transmission adjusting device 8 of this embodiment can adjust a compensation amount $\Delta X$ of a reactance $X_{line}$ of the transmission line 14 by giving an output of the impedance control circuit 93 in the first embodiment as an open-/short-circuiting instruction to the switches 84 to 86.

Figure 6:
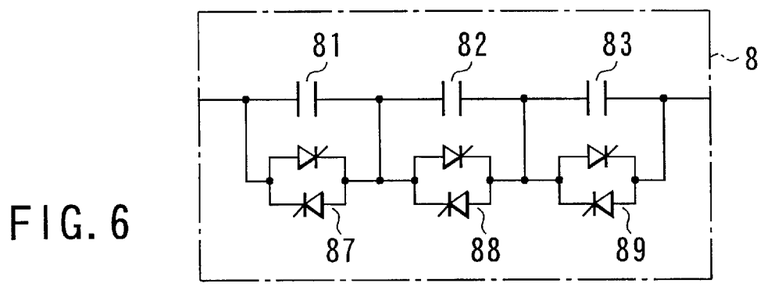
FIG. 6 is a circuit diagram showing a power transmission adjusting device in an apparatus of a third embodiment.

FIG. 6 shows a connection of the power transmission adjusting device 8 in a third embodiment of the present invention.

In FIG. 6, reference numerals 81 to 83 show capacitors and 87 to 89 show semiconductor switching elements. As shown in FIG. 6, parallel circuits each comprising the corresponding capacitor and semiconductor switching element are connected in a series array. Although, in the embodiment above, the three parallel combinations are used, one or more such parallel combinations can be used and they perform basically the same function. Further, as the semiconductor switching element use can be made of not only a thyristor but also a self turn-off element such as a gate turn-off thyristor (GTO). Further, various combinations with a passive device, such as a reactor, in addition to a capacitor, may also be considered as will be set out in connection with the following embodiment. So long as they are so constructed that the impedance can be adjusted, either performs basically the same operation.

In the embodiment above, the switches 84 to 86 in the second embodiment in FIG. 5 are simply replaced with the semiconductor switching elements 87 to 89 and the present embodiment performs the same operation except that, in place of the open-/short-circuiting instruction of the switches 84 to 86, the output of the impedance control circuit 93 is given as gate signals for the semiconductor switching elements 87 to 89.

According to the present embodiment, it is possible to obtain the same effect as in the second embodiment and, by the use of the semiconductor switching elements, it is also possible to obtain merits such as a longer service life and easier maintenance and inspection.

Figure 7:
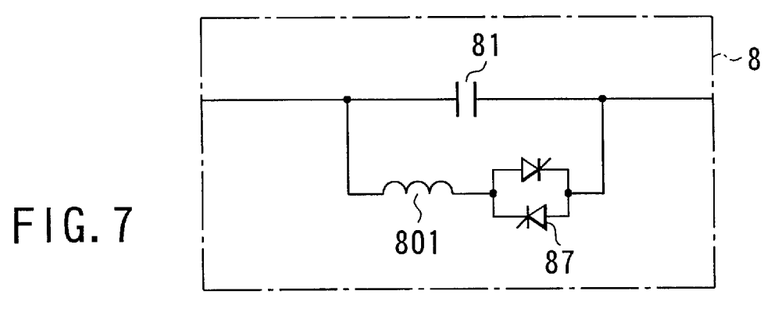
FIG. 7 is a circuit diagram showing a power transmission adjusting device in an apparatus of a fourth embodiment.

FIG. 7 is a circuit arrangement showing the connection of a power transmission adjusting device 8 in a fourth embodiment of the present invention.

In FIG. 7, reference numeral 81 shows a capacitor connected in parallel with a reactor 801 and thyristor switch 87 connected in series with the reactor 801, the thyristor switch 87 having thyristors connected cathode-to-anode. This series parallel connection circuit is known as a thyristor controlled series capacitor (TCSC).

The power transmission adjusting device 8 of the present embodiment is known as the thyristor controlled series capacitor (TCSC) and, here, its function will be described briefly below. With the thyristor switch 87 in an OFF state, the capacitor 81 alone appears connected across the terminals of the power transmission adjusting device 8. With the thyristor switch 87 in a complete ON state, the capacitor 81 and reactor 801 appear connected in a parallel array. By the phase-controlling the gate signal of the thyristor switch 87 the apparent reactance of the reactor 801 can be continuously adjusted in a range from its own reactance XL to infinity.

Thus the power transmission adjusting device 8 can be regarded as a parallel circuit of the apparent reactance ($XL \to \infty$) and capacitor 81 and it is possible to adjust a resultant impedance. By the impedance control circuit 93 it is possible to perform phase control to allow the impedance of the power transmission adjusting device 8 to be matched to the output of the impedance compensation calculation circuit 92.

Figure 8:
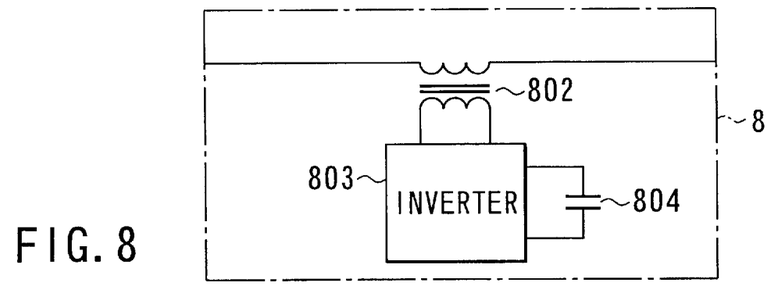
FIG. 8 is a circuit diagram showing a power transmission adjusting device in an apparatus of a fifth embodiment.

FIG. 8 shows a connection of a power transmission adjusting apparatus in a fifth embodiment of the present invention.

In FIG. 8, reference numeral 802 shows an insulated transformer having a primary winding connected in series with the transmission line 14; 803, an inverter connecting self turn-off elements, such as gate turn-off thyristors (GTOs), connected in a bridge configuration; and 804, a capacitor. This circuit is known as a static synchronous series compensator (SSSC). Since the function of the power transmission device 8 of the present embodiment is known as the SSSC, here, this function will be explained briefly below. The inverter 803 has a magnitude and phase of its output voltage freely controlled by a PWM control, etc., through the utilization of the voltage of the capacitor 804 connected to a DC side.

Thus, it can act as a variable series capacitor or variable series reactor by supplying, through the insulated transformer 802, an output voltage. Therefore, the phase control can be made to allow the impedance of the power transmission adjusting device 8 to be matched to an output of the impedance compensation amount calculation circuit 92.

Figure 9:
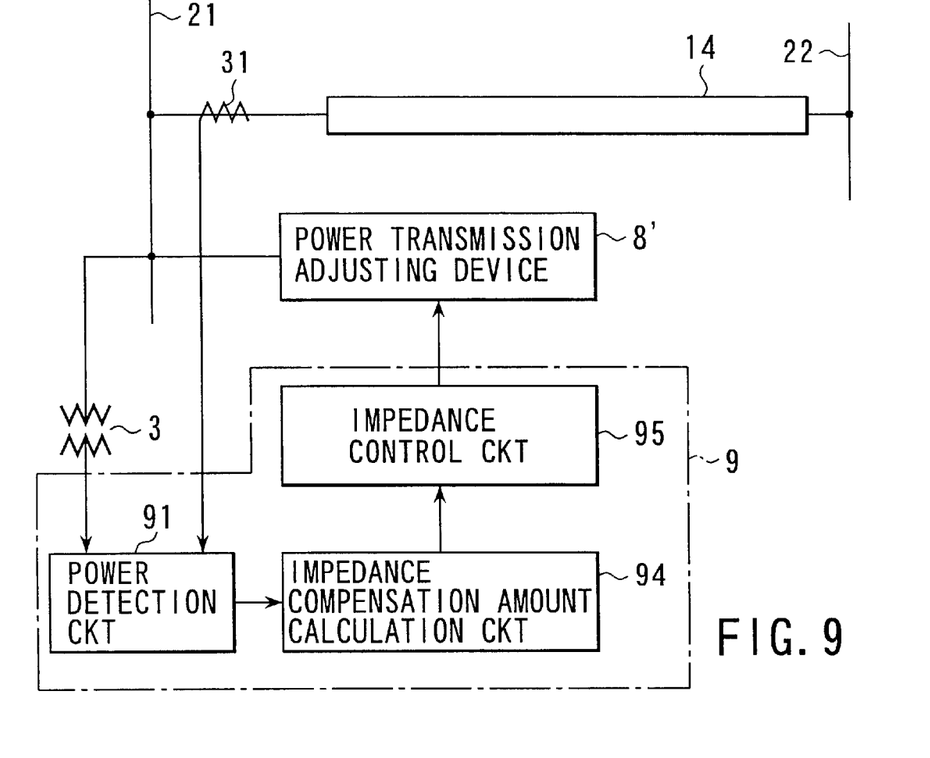
FIG. 9 is a circuit diagram showing an apparatus of a sixth embodiment.

FIG. 9 is a circuit diagram showing the connection of an apparatus of a sixth embodiment of the present invention and block diagram showing a controller for a power transmission adjusting device.

In FIG. 9, the same reference numerals are employed to designate parts or elements corresponding to those shown in FIG. 2 and their different part will be explained below. Reference numeral 8' shows a power transmission adjusting device connected in parallel with a bus 21, not in series with a transmission line 14. Further, in a controller 9 for the power transmission adjusting device 8', an impedance compensation amount calculation circuit 94 is connected to an output of a power detection circuit 91 and an impedance control circuit 95 is connected to the output of the impedance compensation amount calculation circuit 94. It is to be noted that, although 94 and 95 are described as the impedance compensation amount calculation circuit and impedance control circuit 95, respectively, these can be represented, in more detail, by an admittance compensation amount calculation circuit and admittance control circuit because these circuits are adapted to calculate and control the admittance.

Now the operation of the present embodiment will be explained below. In the same way as explained in connection with the first embodiment of FIG. 2, an equivalent circuit of the transmission line shown in FIG. 2 is considered and it is possible to obtain the above-mentioned Equation (3) as a condition under which a voltage fluctuation becomes smaller.

The impedance compensation amount calculation circuit 94 performs the same calculation up to Equation (3) as in the first embodiment and, thereafter, the following calculation is carried out.

Although a reactance $X_{line}$ and admittance $Y_{line}$ of the transmission line 14 are known, according to the present invention the $X_{line}$ cannot be compensated and parallel admittance $y_{line}$ can be compensated. Therefore, in order to achieve the compensation admittance $\Delta Y$ $$\Delta Y = Y - Y_{line} = (X_{line}/Z_{line}^2) - Y_{line} \quad (5),$$

it is only necessary to adjust the output of the power transmission adjusting device 8'. Therefore, the output control of the power transmission device 8' is made by the impedance control circuit 95 to provide a capacitive admittance when the compensation admittance $\Delta Y$ is negative.

As a result, a reactive power output for compensating a voltage fluctuation in the transmission line 14 is generated in the power transmission adjusting device 8' to allow voltages on the buses 21, 22 to be made equal in magnitude to each other. It is to be noted that the impedance shown in Equation (1) is established by the distributed constant circuit. Even if, however, compensation is made at one lumped site as in the present embodiment under a commercial frequency, an error becomes smaller and an adequate performance is exhibited in a practical application. Further, in the case of a longer distance transmission line, if the power transmission adjusting device 8' and its controller 9 shown in the present embodiment are provided at each proper interval of a switching station, substation, etc., on the way, a compensation effect of the voltage is more enhanced.

The matter relating to the power factor of the transmission line and matter finding the $Z_{line}$ from the current are the same as those in the first embodiment and their explanation is omitted.

According to the present embodiment, a reactive power for canceling a voltage fluctuation resulting from the reactance of the transmission line is generated in the power transmission adjusting device inserted in a parallel array to allow the voltage fluctuation which is generated in the transmission line to be compensated. Further, in the power transmission adjusting device 8' of the present embodiment, the transmission line as a compensation target is initially determined and is not affected by the other fluctuation factors on the power system side. Therefore, the present system operates stably and produces no overload if a capacity is so initially determined as to meet the maximum power flow in the transmission line.

Figure 10:
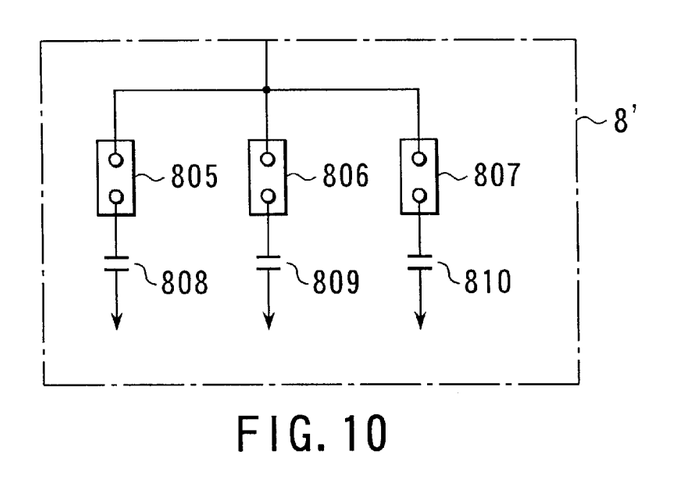
FIG. 10 is a circuit diagram showing a power transmission adjusting device in an apparatus of a seventh embodiment.

FIG. 10 is a circuit diagram showing the connection of a power transmission adjusting device 8' in a seventh embodiment of the present invention.

In FIG. 10, reference numerals 808 to 810 show capacitors and 805 to 807 show switches. As shown in FIG. 10, a plurality of parallel arrays are connected, each comprising a capacitor and switch. In the present embodiment, three parallel combinations are shown but one or more parallel combinations may be used under fundamentally the same function. Further, it may be possible to partly replace the capacitor with a shunt reactor.

In the present embodiment, with the switch 805 closed, the capacitor 808 operates with respect to the terminals of the power transmission adjusting device 8' and, with the switch 805 open, the capacitor 808 is ignored. With the static capacitances of the capacitors 808 ... 810 represented by C1, C2, C3, respectively, the static capacitance of the power transmission adjusting device 8' becomes C1, provided that, for example, the switch 805 alone is closed and the remaining switches 806 and 807 are open. In the case where all the switches are closed, the static capacitance becomes C1+C2+C3. Even if any other switch open/closed combinations are used, it is possible to calculate the static capacitance similarly. In other words, the power transmission adjusting device 8' of the present embodiment enables a compensation amount of admittance $Y_{line}$ in the transmission line 14 to be adjusted by giving a closed/open instruction for the switches 805 to 807 from the output of the impedance control circuit 95 in the sixth embodiment of FIG. 9.

Figure 11:
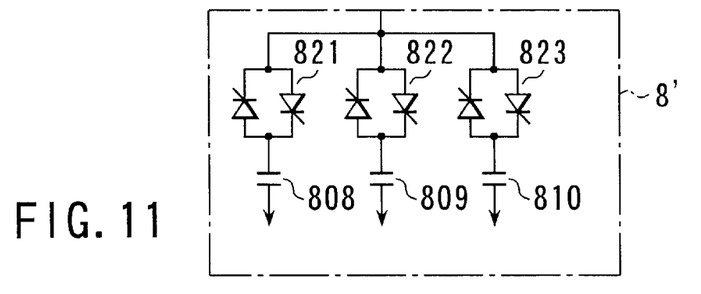
FIG. 11 is a circuit diagram showing a power transmission adjusting device in an apparatus of an eighth embodiment.

FIG. 11 is a circuit diagram showing the connection of a power transmission adjusting device 8' in an eighth embodiment of the present invention.

In FIG. 11, reference numerals 808 to 810 show capacitances and 821 to 823 show semiconductor switching elements and, as shown in FIG. 10, a plurality of parallel circuits are provided, each comprising a series circuit of the capacitor and semiconductor switching element. In the present embodiment, three parallel combinations are used and one or more such parallel combinations may be used in which case these performs fundamentally the same function. Further, use can be made of not only the thyristor but also a self turn-off element such as a gate turn-off thyristor (GTO).

Further, various combinations with a passive device such as a reactor, in addition to the capacitor, as will be set out below may be considered and they may be used so long as the impedance can be adjusted.

The present embodiment performs the same function except that the switches 805 to 807 in the seventh embodiment of FIG. 10 are simply replaced with the semiconductor switching elements 821 to 823 and, from the output of the impedance control circuit 95, the gate signals for the semiconductor switching elements 821 to 823 are given in place of the open-/short-circuiting instruction for the switches 805 to 807.

According to the present embodiment, it is possible to obtain the same effect as that of the seventh embodiment and it is also possible to obtain the advantages of a long service life and easier maintenance and inspection by the use of the semiconductor switching element.

Figure 12:
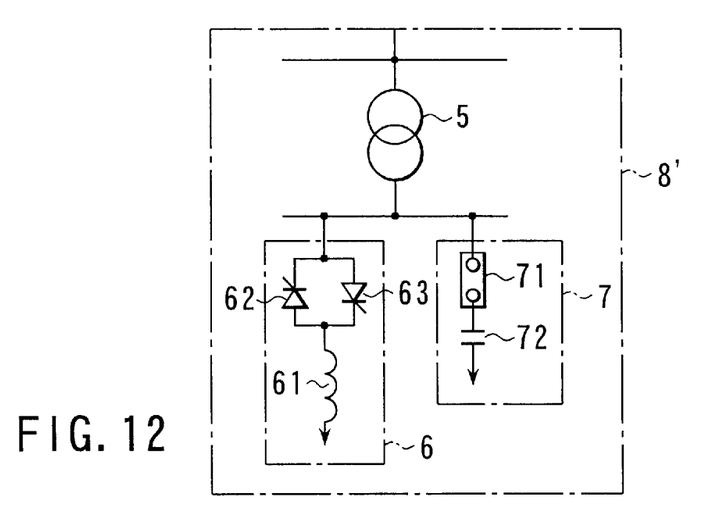
FIG. 12 is a circuit diagram showing a power transmission adjusting device in an apparatus of a ninth embodiment.

FIG. 12 is a circuit diagram showing the connection of a power transmission adjusting device 8' in the ninth embodiment of the present invention.

In FIG. 12, a main circuit arrangement of the power transmission adjusting device 8' is the same as in the conventional static var compensator (SVC) and the explanation of individual elements are omitted. It is to be noted, however, that the controller for controlling thyristors 62, 63 is comprised of a controller 9 for the power transmission adjusting device 8' in the present embodiment, not the controller 4 for the SVC in the conventional system.

The function of the power transmission adjusting device 8' of the present embodiment will be explained below. With the thyristors 62, 63 in an OFF state, a reactor 61 appears unconnected and the reactive power output of a thyristor controlled reactor (TCR) 6 becomes a zero. With the thyristors 62, 63 in a fully ON state, the reactive power output of the thyristor controlled reactor (TCR)6 becomes equal to a rated reactive power output of the reactor 61. By the phase control of the gate signals of the thyristors 62, 63 the reactance of the thyristor controlled reactor (TCR) 6 can be continuously adjusted in a range from a reactance XL of the reactor 61 itself to an infinity. Thus, the reactive power output of the thyristor controlled reactor (TCR) 6 can be adjusted between a reactive power output involved when the reactor 61 is not phase-controlled and a zero. Therefore it is only necessary that the phase control be effected by the impedance control circuit 95 to allow the reactive power output of the power transmission adjusting device 8' to be matched to the output of the impedance compensation amount calculation circuit 94.

Further, with a switch 71 closed, a capacitor 72 is connected to allow a capacitive reactive power to be supplied as an output of the power transmission adjusting device 8' and, by the combination of the state condenser 7 and thyristor controlled reactor (TCR) 6, it is possible to broaden a control range of the reactive power.

Figure 13:
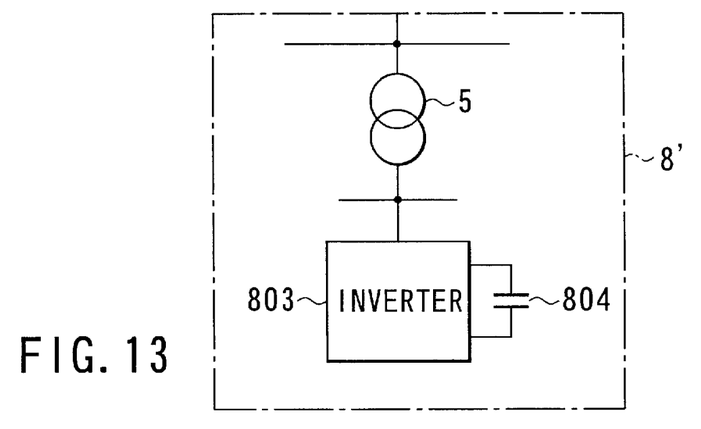
FIG. 13 is a circuit diagram showing a power transmission adjusting device in an apparatus of a tenth embodiment.

FIG. 13 is a circuit diagram showing the connection of a power transmission adjusting device 8' in a tenth embodiment of the present invention.

In FIG. 13, reference numeral 5 shows a down voltage transformer; 803, an inverter having self turn-off elements, such as gate turn-off thyristors (GTOs), connected in a bridge configuration; and 804, a capacitor.

The power transmission adjusting device 8' of the present embodiment is known as a self-excited type static synchronous compensator (STATCOM) and, here, the operation will be explained briefly below. The inverter 803 can freely control the magnitude of an output voltage, by a PWM control for instance, through the utilization of a voltage on the capacitor 804 connected on a DC side. When, therefore, an output voltage of the inverter 803 is made higher than the system voltage, a reactive power is supplied (a capacitive operation). When, on the other hand, the output voltage of the inverter 803 is made lower than the system voltage, a reactive power is absorbed (an inductive operation). By doing so it is possible to adjust the reactive power output. Therefore, it is only necessary to operate the impedance control circuit 95 so as to allow the reactive power output to follow an output of the impedance compensation amount calculation circuit 95 in FIG. 9.

Figure 14:
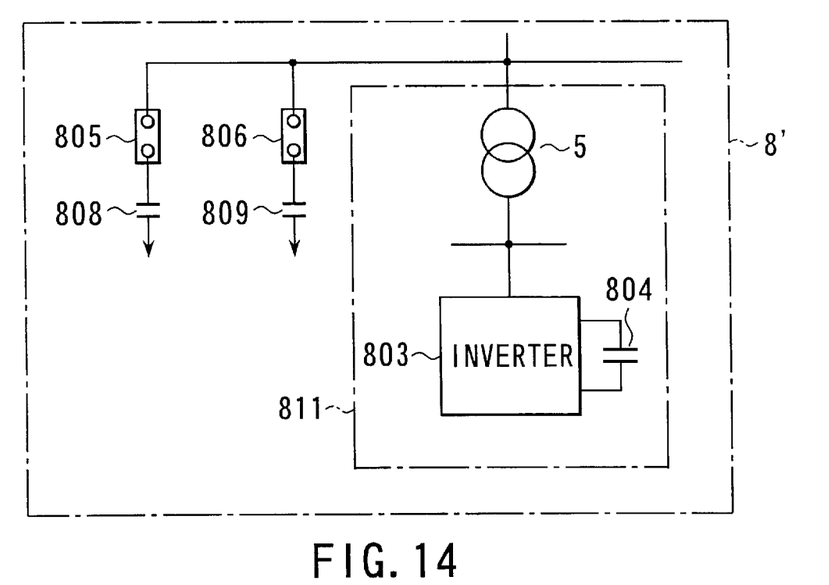
FIG. 14 is a circuit diagram showing a power transmission adjusting device in an apparatus of an eleventh embodiment.

FIG. 14 is a circuit diagram showing the connection of a power transmission adjusting device 8' in an eleventh embodiment of the present invention.

In FIG. 14, reference numerals 808, 809 show capacitors and 805, 806 show switches. This is the same structure as explained in connection with the seventh embodiment of FIG. 10. Reference numeral 5 shows a down voltage transformer; 803 shows an inverter having self turn-off elements, such as gate turn-off thyristors (GTOS) connected in a bridge configuration; 804 shows a capacitor. This is the same structure as explained in connection with the tenth embodiment of FIG. 13.

In the power transmission adjusting device 8' of the present embodiment, a section constituted by the capacitors 808, 809 and switches 805, 806 performs the same function as set out in connection with the seventh embodiment. Further, a self-excited type static reactive power compensation device (STATCOM) 811 comprising a down voltage transformer 5, inverter 803 and capacitor 804 performs the same function as that in the tenth embodiment of FIG. 13.

Figure 15:
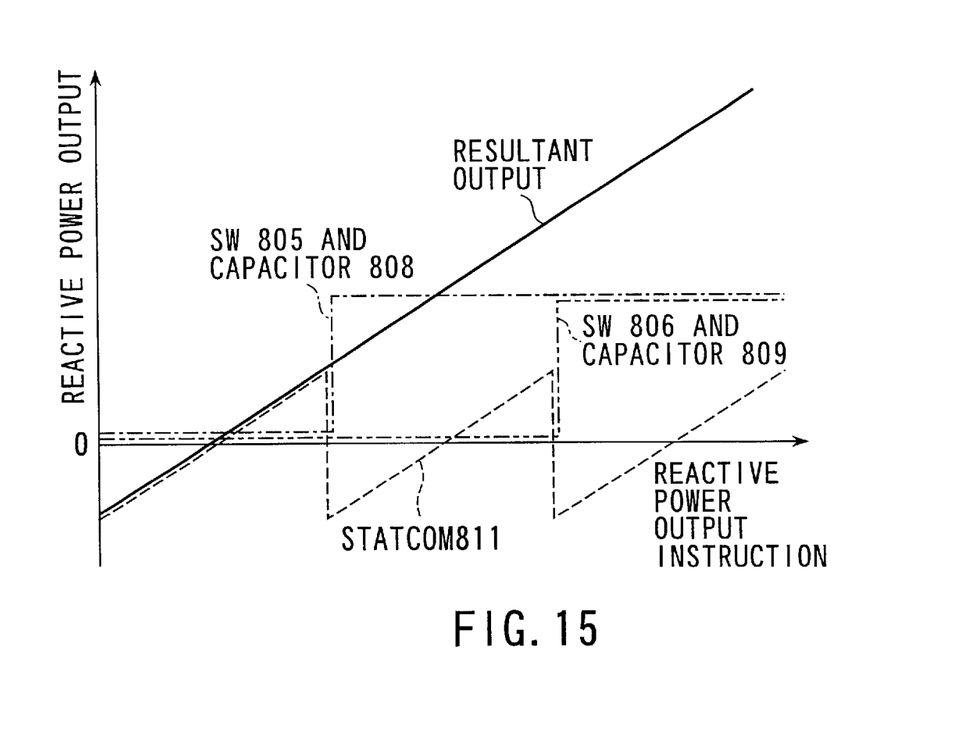
FIG. 15 is a graph diagram showing a function of the eleventh embodiment; the eleventh embodiment.

The present embodiment performs such a function that, by the combination of these, as shown in FIG. 15, the self-excited type static reactive power compensation device (STATCOM) 811 reveals a continuous trace for a smaller fluctuation of a reactive power output and provides an output fluctuation by the capacitors 808, 809 and switches 805, 806 for a greater fluctuation of the reactive power output. By doing so, it is possible to continuously adjust the reactive power output over a broader range. In order that a resultant reactive power output follows an output of the impedance compensation amount calculation circuit 94 of FIG. 7, the impedance control circuit 95 has to be operated to allow the opening/closing of the switches 805, 806 to be done and the control of the inverter 803 to be done.

Figure 16:
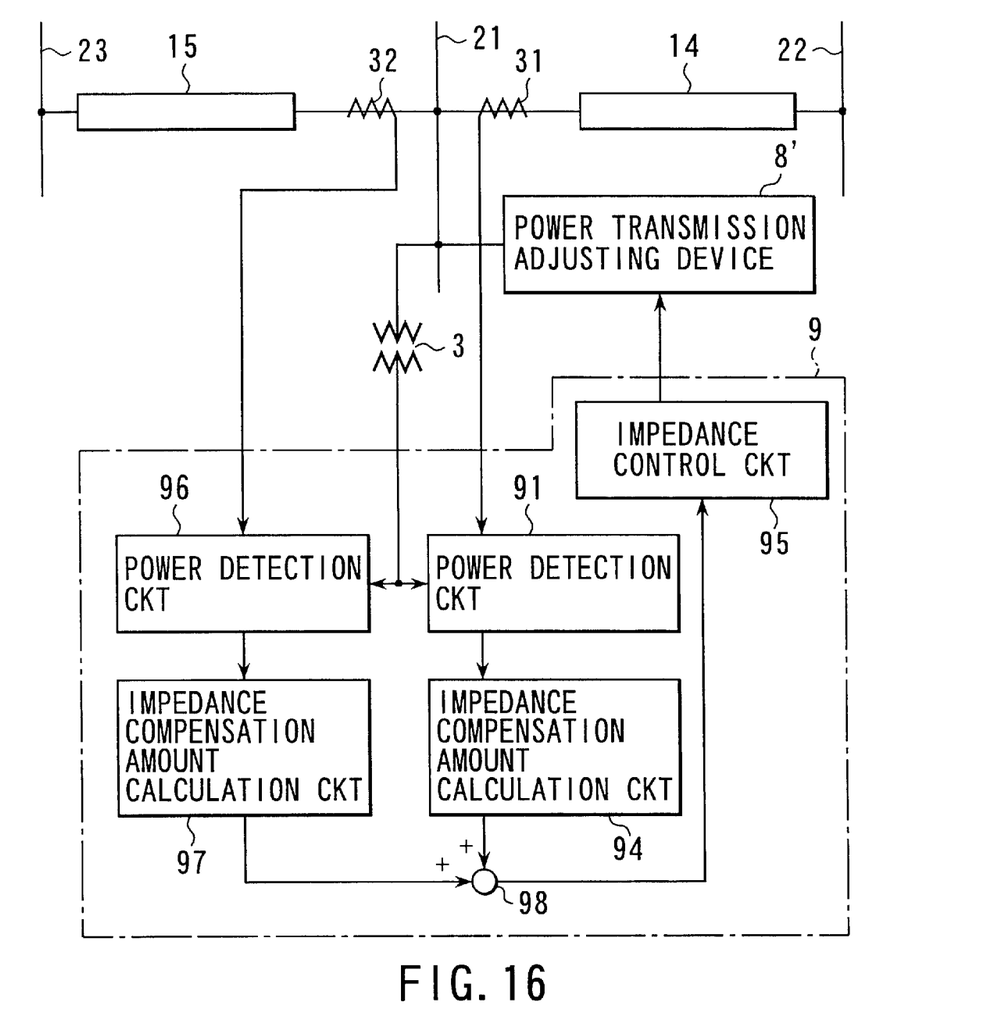
FIG. 16 is a circuit diagram showing an apparatus of a twelfth embodiment.

FIG. 16 is a circuit arrangement showing the connection of an apparatus in a twelfth embodiment of the present invention and a block diagram showing a controller for a power transmission adjusting device.

In FIG. 16, the same reference numerals are employed to designate the same elements corresponding to those in FIG. 9 and their different portion will be explained below. Reference numeral 23 shows a bus of a power system; 15, a transmission line; and 32, a current transformer 32. Further, a power detection circuit 96, impedance compensation amount calculation circuit 97 and adding circuit 98 are additively provided in the controller 9 for a power transmission adjusting device 8' and the output of the adding circuit 98 is input to an impedance control circuit 95. Although, in the above-mentioned embodiment, two transmission line sets are connected to the bus 21, if more are added, a current transformer, electric detection circuit and compensation amount calculation circuit are added and a corresponding output is applied to the adding circuit. By doing so, it is possible to obtain the same function and advantage as will be explained below.

It is evident that, with respect to the respective transmission lines 14 and 15, the present embodiment performs the same function as the sixth embodiment of FIG. 9. And this explanation is omitted. The feature of the present embodiment lies in that, in the controller 9 for the power transmission adjusting device 8', the outputs of the impedance compensation amount calculation circuits 94 and 97 are supplied to the adding circuit 98 and, after a resultant total impedance compensation amount has been calculated, it is input to the impedance control circuit 95 and that the output control of the power transmission adjusting device 8' connected to the bus line 21 commonly connected to the transmission lines 14 and 15 is carried out.

In the present embodiment, the impedance is controlled in accordance with a calculated total impedance compensation amount and a reactive power corresponding to its control amount is supplied from the power transmission adjusting device 8' or absorbed. At this time, the reactive power from the power transmission adjusting device 8' is divided into the transmission lines 14, 15 in accordance with the condition of the power system and, in a stricter sense, it is not divided just in accordance with the calculated ones of the impedance compensation amount calculation circuits 94 and 97.

Since, however, the total compensation amount is matched, it is possible to expect that the voltage of the system can be maintained in a predetermined range not only in the case of simply compensating the two together but also since, in a parallel compensation in a distributed array at each site of the power system, the total compensation amount is met. Even in this case, if the capacity of the power transmission adjusting device 8' is properly so set as to meet the number of transmission line sets, it is possible to obtain the same advantage as in the case where the sixth embodiment of FIG. 9 is individually arranged.

Further, a plurality of power transmission adjusting devices can be provided as a lumped one and, in general, it is possible to reduce an installation space and apparatus cost.

Figure 17:
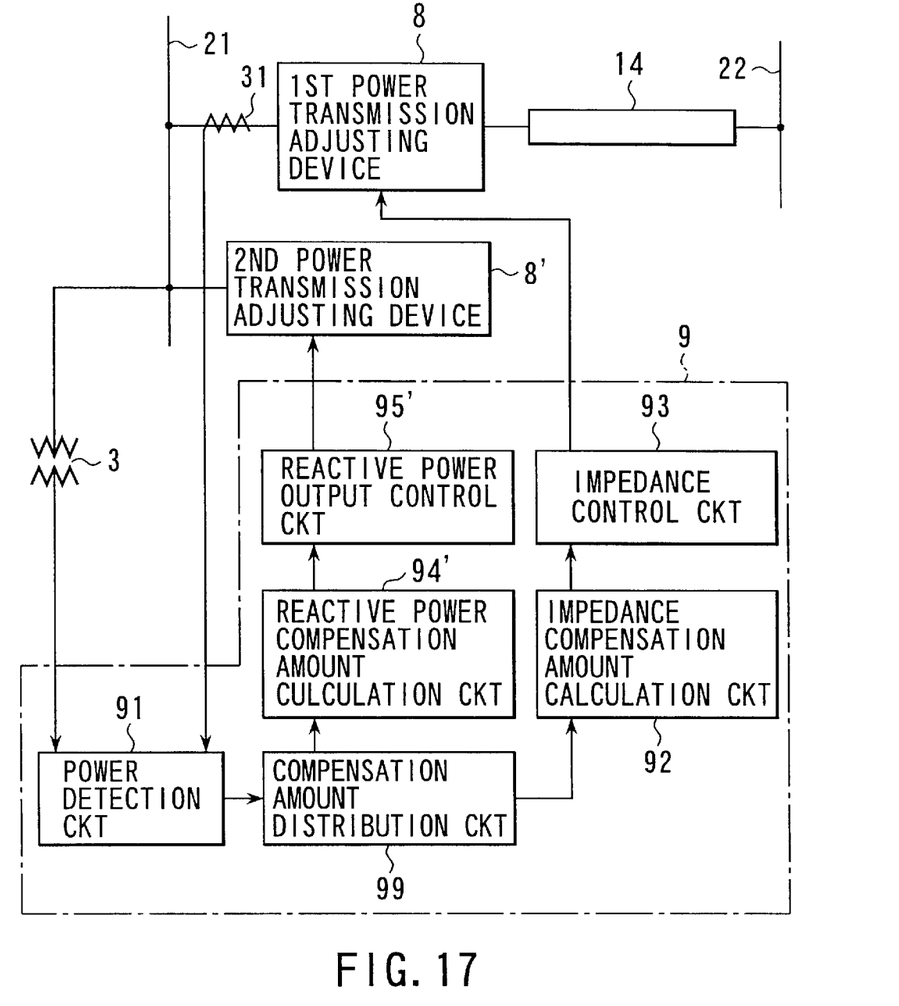
FIG. 17 is a circuit diagram showing an apparatus of a thirteenth embodiment.

FIG. 17 is a circuit diagram showing the connection of an apparatus of a thirteenth embodiment of the present embodiment and a block diagram showing a controller for power transmission adjusting devices.

In FIG. 17, the same reference numerals are employed to designate elements corresponding to those shown in FIGS. 2 and 9 and their different portion will be explained below. In this embodiment, a power transmission adjusting device 8 is connected in series with a transmission line 14 and in parallel with a power transmission adjusting device 8'. The controller 9 for the power transmission devices 8 and 8' includes a reactive power compensation amount calculation circuit 94', reactive power output control circuit 95' and impedance compensation amount calculation circuit 92 and impedance control circuit 93 and further a compensation amount distribution circuit 99. Further, a power detection circuit 91 detects an active power and reactive power and supplies them to the compensation amount distribution circuit 99.

The operation of the apparatus of the present embodiment will be explained below. A current in the transmission line and voltage are detected by a current transformer 31 and voltage transformer 3, respectively, and an active power P and reactive power Q are detected at the power detection circuit 91. The output of the power detection circuit 91 is supplied to the compensation amount distribution circuit 99 where a reactive power Q is distributed into the reactive power compensation amount calculation circuit 94' and an active power P is distributed into the impedance compensation amount calculation circuit 92. The operations of the impedance compensation amount calculation circuit 92 and impedance control circuit 93 and power transmission adjusting device 8 are the same as set out in connection with the first embodiment of FIG. 2.

The reactive power compensation calculation circuit 94' has, from its control manner, a control amount retaining function or an integrating type feedback control function and outputs a reactive power instruction value corresponding to a reactive power opposite in polarity to, but equal in magnitude to, an input reactive power to the reactive power output control circuit 95' to allow the reactive power to become a zero. By doing so, the power factor of the power flowing in the transmission line 14 becomes unity.

Thus it is possible to secure the power factor (unity) of the transmission line 14 on which an impedance compensation calculation is based. In this point, there occurs no error and a voltage fluctuation occurring in the transmission line can be more effectively compensated.

According to the present embodiment, in order to cancel a voltage fluctuation generated in the reactance of the transmission line, a voltage is generated in the series-connected power transmission adjusting device and a reactive power output is generated at the parallel-connected power transmission adjusting device. By doing so, the power factor of the power flowing in the transmission line 14 is so controlled as to become unity and it is possible to more effectively compensate a voltage fluctuation generated in the transmission line.

In the present invention, the electric parameter of the transmission line as a compensation target is detected, the control parameter is calculated based on the detected electric parameter and the adjusting device arranged in a serial and/or parallel with the transmission line as a compensation target is adjusted based on the calculated control parameter. Arranging the adjusting device on the transmission line at any specific array, that is, a series array, parallel array or serial/parallel array is determined for each format (type, capacity, magnitude, etc.) of the transmission line to be applied while considering several factors as will be set out below.

First, a first factor is a short-circuiting capacity.

In the case where the adjusting device is arranged in a series-array on the transmission line near to a large capacity power source, a larger short-circuiting capacity is required and, in the case of the series array where, at a fault time, a short-circuiting current flows directly into the adjusting device, it is necessary to adopt a method of a countermeasure against such a larger short-circuiting current and its countermeasure devices.

In the case where, on the other hand, the adjusting device is arranged in a parallel array on the transmission line, no short-circuiting current flows directly into the compensating means at a fault time and there is no need to provide the countermeasure method and device in such a series array and a low cost is obtained as an advantage.

In the case where many transmission lines are involved and if the voltage compensation of these transmission lines is to be achieved by the parallel array, then it is necessary to arrange the adjusting devices in a parallel array for each transmission line and a rise in cost is incurred.

Therefore, the selection of any specific array from the series array, parallel array or series/ parallel array at which the adjusting device is arranged on the transmission line should be determined not only by the involved power source, load, transmission line, etc., and allowable cost, etc., but also by the following factor as will be described later.

A second factor is reliability in operation.

Generally, in the case where the adjusting device is arranged on the transmission lines in a series array, it is thought that the reliability is lower in operation because the failure of the adjusting device is directly linked to the stoppage of the power transmission.

Since, however, the reliability can be compensated by adopting a method of a countermeasure against the fault of the adjusting device and a countermeasure device, it cannot be easily said at all times that the parallel array system is advantageous over the series array system in terms of their reliability.

Therefore, the selection of any specific array from the series array, parallel array or series/ parallel array at which the adjusting device is arranged on the transmission line should be determined by the earlier-mentioned factors and factor as will be set out below while considering the extent of reliability required.

A third factor is a stability.

A system for arranging the adjusting device in the series array on the transmission line directly adjusts the impedance on the transmission line and imparts a greater influence to the stability involved.

However, it is not easily be said at all times that, since the stability can be compensated by adopting a method of compensating a stability and a countermeasure device, the parallel array system is advantageous over the series array system in terms of the stability involved.

Thus, the selection of any specific array from the series array, parallel array and serial/parallel array at which the adjusting device is connected to the transmission line should be determined by the earlier-mentioned factors while considering the extent of a reliability required.

According to the present invention, as set out above, a method and system are provided which can control a voltage on the transmission line to a constant level by compensating a voltage fluctuation produced in the transmission line.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system applied to a power system having a plurality of transmission lines and compensating a voltage fluctuation in the transmission line, comprising:

detecting means for detecting an electric parameter of a transmission line of the transmission lines which involves the voltage fluctuation to be compensated;

calculating means for calculating a control parameter for adjusting the voltage on the transmission line on the basis of the electric parameter detected by the detecting means;

compensating means for compensating the voltage fluctuation in the transmission line on the basis of the control parameter calculated by the calculating means; and wherein said detecting means has means for detecting a voltage of the transmission line involving the voltage fluctuation to be compensated and its power flow and said calculation means has means for calculating a compensation impedance on the basis of the voltage and power flow detected by said detecting means.

2. A system according to claim 1, wherein said compensating means is arranged in a series array and/or parallel array on the transmission line involving a voltage fluctuation to be compensated and has means for generating and consuming a reactive power and/or adjusting an impedance.

3. A system according to claim 1, wherein said compensating means is provided on the transmission line involving a voltage fluctuation to be compensated and comprised of reactive power adjusting means including a semiconductor switching element and at least one of power capacitors and shunt reactors.

4. An apparatus for compensating a voltage fluctuation in a transmission line, comprising:

an adjusting device provided on an electric system having a plurality of transmission line members and adjusting at least one of a reactive power and an impedance;

a detecting section for detecting an electric parameter of a transmission line member of the transmission line members which involves the voltage fluctuation to be compensated;

a calculating section for calculating a compensation amount for adjusting the voltage of the transmission line member on the basis of the electric parameter detected by the detecting section;

a control section for generating a control signal to be given to the adjusting device on the basis of the compensation amount calculated by the calculating section; and wherein said detecting section has means for detecting a voltage and power flow of the transmission line member of the transmission line members which involves a voltage fluctuation, said calculating section has means for calculating an impedance compensation amount on the basis of the voltage and the power flow of the transmission line member detected by said detecting section, and said control section has means for generating a control signal to be given to the adjusting device on the basis of the impedance compensation amount calculated by said calculating section.

5. An apparatus according to claim 4, wherein said detecting section has means for detecting an electric parameter at least one interval of the transmission line member of the transmission line members which involves a voltage to be compensated.

6. An apparatus according to claim 4, wherein said adjusting device is inserted in a parallel array on the transmission line, said detecting section includes first and second detecting means detecting electric parameters of first and second transmission lines included in the transmission line member, the calculating section has first and second calculating means calculating impedance compensation amounts of the first and second transmission lines on the basis of the electric parameters of the first and second transmission lines detected by the first and second detecting means of the detecting section, and the control section has means for providing a resultant impedance compensation amount of the first and second transmission lines calculated by the first and second calculating means and generating an impedance control signal to be given to the adjusting device on the basis of the resultant impedance compensation amount.

7. An apparatus according to claim 4, wherein said adjusting device having a first adjusting unit inserted in a series array on the transmission line and a second adjusting unit inserted in a parallel array on the transmission line, said calculation section has distributing means for calculating a reactive power instruction for regulating a reactive power compensation amount on the basis of the electric parameter from said detecting section and an active power instruction for regulating an impedance compensation amount on the basis of the electric parameter from said detecting section, a reactive power compensation amount calculating means for calculating a reactive power compensation amount on the basis of the reactive power instruction from said distributing means and impedance compensation amount calculating means for calculating an impedance compensation amount on the basis of the active power instruction from said distributing means, and said control section has first control means for generating an impedance control signal to be given to the first adjusting unit on the basis of the impedance compensation amount calculated by the impedance compensation amount calculating means and second control means for generating a reactive power control signal to be given to the second adjusting unit on the basis of the reactive power compensation amount calculated by the reactive power compensation amount calculating means.

8. An apparatus according to claim 4, wherein the adjusting device has a passive device comprised of at least one of a state condenser and shunt reactor and a switch for making a value of the passive device variable.

9. A system applied to a power system having a plurality of transmission lines and compensating a voltage fluctuation in the transmission line, comprising:

detecting means for detecting an electric parameter of a transmission line of the transmission lines which involves the voltage fluctuation to be compensated;

calculating means for calculating a control parameter for adjusting the voltage on the transmission line on the basis of the electric parameter detected by the detecting means;

compensating means for compensating the voltage fluctuation in the transmission line on the basis of the control parameter calculated by the calculating means; and wherein said detecting means has means for detecting a voltage and a current of the transmission line involving a voltage fluctuation to be compensated and said calculating means has means for calculating a compensation impedance on the basis of the voltage and the current detected by the detecting means.

10. An apparatus for compensating a voltage fluctuation in a transmission line, comprising:

an adjusting device inserted in a serial array on the transmission line having a plurality of transmission line members and adjusting at least one of a reactive power and an impedance;

a detecting section for detecting an electric parameter of a transmission line member of the transmission line members which involves a voltage fluctuation to be compensated;

a calculating section for calculating a compensation amount for adjusting a voltage of the transmission line member on the basis of the electric parameter detected by the detecting section;

a control section for generating a control signal to be given to the adjusting device on the basis of the compensation amount calculated by the calculating section; and wherein said detecting section has means for detecting a voltage and a power flow of the transmission line member of the transmission line members which involves a voltage fluctuation, said calculating section has means for calculating an impedance compensation amount on the basis of the voltage and the power flow of the transmission line member detected by said detecting section, and said control section has means for generating a control signal to be given to the adjusting device on the basis of the impedance compensation amount calculated by said calculating section.

11. An apparatus for compensating a voltage fluctuation in a transmission line, comprising:

an adjusting device inserted in a parallel array on the transmission line having a plurality of transmission line members and adjusting at least one of a reactive power and an impedance;

a detecting section for detecting an electric parameter of a transmission line member of the transmission line members which involves a voltage fluctuation to be compensated;

a calculating section for calculating a compensation amount for adjusting a voltage of the transmission line member on the basis of the electric parameter detected by the detecting section;

a control section for generating a control signal to be given to the adjusting device on the basis of the compensation amount calculated by the calculating section; and wherein said detecting section has means for detecting a voltage and a power flow of the transmission line member of the transmission line members which involves a voltage fluctuation, said calculating section has means for calculating an impedance compensation amount on the basis of the voltage and the power flow of the transmission line member detected by said detecting section, and said control section has means for generating a control signal to be given to the adjusting device on the basis of the impedance compensation amount calculated by said calculating section.

12. An apparatus for compensating a voltage fluctuation in a transmission line, comprising:

an adjusting device provided on an electric system having a plurality of transmission line members and adjusting at least one of a reactive power and an impedance;

a detecting section for detecting an electric parameter of a transmission line member of the transmission line members which involves a voltage fluctuation to be compensated;

a calculating section for calculating a compensation amount for adjusting a voltage of the transmission line member on the basis of the electric parameter detected by the detecting section; and a control section for generating a control signal to be given to the adjusting device on the basis of the compensation amount calculated by the calculating section, wherein said adjusting device is inserted in a parallel array on the transmission line, said detecting section includes first and second detecting means detecting electric parameters of first and second transmission lines included in the transmission line member, the calculating section has first and second calculating means calculating impedance compensation amounts of the first and second transmission lines on the basis of the electric parameters of the first and second transmission lines detected by the first and second detecting means of the detecting section, and the control section has means for providing a resultant impedance compensation amount of the first and second transmission lines calculated by the first and second calculating means and generating an impedance control signal to be given to the adjusting device on the basis of the resultant impedance compensation amount.

13. An apparatus for compensating a voltage fluctuation in a transmission line, comprising:

an adjusting device provided on an electric system having a plurality of transmission line members and adjusting at least one of a reactive power and an impedance;

a detecting section for detecting an electric parameter of a transmission line member of the transmission line members which involves a voltage fluctuation to be compensated;

a calculating section for calculating a compensation amount for adjusting a voltage of the transmission line member on the basis of the electric parameter detected by the detecting section;

a control section for generating a control signal to be given to the adjusting device on the basis of the compensation amount calculated by the calculating section; and wherein said adjusting device having a first adjusting unit inserted in a series array on the transmission line and a second adjusting unit inserted in a parallel array on the transmission line, said calculation section has distributing means for calculating a reactive power instruction for regulating a reactive power compensation amount on the basis of the electric parameter from said detecting section and an active power instruction for regulating an impedance compensation amount on the basis of the electric parameter from said detecting section, a reactive power compensation amount calculating means for calculating a reactive power compensation amount on the basis of the reactive power instruction from said distributing means and impedance compensation amount calculating means for calculating an impedance compensation amount on the basis of the active power instruction from said distributing means, and said control section has first control means for generating an impedance control signal to be given to the first adjusting unit on the basis of the impedance compensation amount calculated by the impedance compensation amount calculating means and second control means for generating a reactive power control signal to be given to the second adjusting unit on the basis of the reactive power compensation amount calculated by the reactive power compensation amount calculating means.

* * * * *